United States Patent [19]

Repetto et al.

[11] Patent Number: 5,540,877
[45] Date of Patent: Jul. 30, 1996

[54] METHOD OF MAKING A CONTINOUS FIBER REINFORCED RESIN TRANSFER MOLDED FRAME FOR A GAME RACQUET

[75] Inventors: David Repetto, Park Ridge; David Brittingham, Bolingbrook, both of Ill.; Charles Tricou, State College, Pa.

[73] Assignee: Wilson Sporting Goods Co., Chicago, Ill.

[21] Appl. No.: 201,198

[22] Filed: Feb. 24, 1994

[51] Int. Cl.$^6$ .......................... B29C 45/14; B29C 70/16; B29C 70/48
[52] U.S. Cl. .......................... 264/513; 264/102; 264/257; 264/258; 264/314; 156/173; 156/175; 156/285; 273/73 F
[58] Field of Search .......................... 264/513, 257, 264/258, 314, 102, 101; 156/173, 175, 285, 286; 273/73 F, 73 C

[56] References Cited

U.S. PATENT DOCUMENTS

| | | |
|---|---|---|
| 1,024,915 | 4/1912 | Subers . |
| 2,923,652 | 2/1960 | Oka . |
| 3,755,037 | 8/1973 | Erwin .................... 273/73 F |
| 3,892,831 | 7/1975 | Robin . |
| 3,998,458 | 12/1976 | Inoue . |
| 4,061,806 | 12/1977 | Lindler . |
| 4,070,020 | 1/1978 | Dano . |
| 4,089,727 | 5/1978 | McLain . |
| 4,123,054 | 10/1978 | Septier . |
| 4,128,963 | 12/1978 | Dano . |
| 4,135,035 | 1/1979 | Branen . |
| 4,157,181 | 6/1979 | Cecka . |
| 4,172,175 | 10/1979 | Pearson . |
| 4,183,776 | 1/1980 | Staub et al. .................... 264/314 |
| 4,389,269 | 6/1983 | Cooper . |
| 4,848,745 | 7/1989 | Bohannan . |
| 4,892,764 | 1/1990 | Drain . |
| 4,983,242 | 1/1991 | Reed . |
| 5,075,056 | 12/1991 | Umlauft . |
| 5,143,669 | 9/1992 | Mott .................... 264/314 |
| 5,176,868 | 1/1993 | Davis . |
| 5,261,980 | 11/1993 | Pearce . |
| 5,332,606 | 7/1994 | Pearce .................... 156/173 |

FOREIGN PATENT DOCUMENTS

| | | |
|---|---|---|
| 170178 | 5/1986 | European Pat. Off. . |
| 470896A2 | 2/1991 | European Pat. Off. . |
| 1512401 | 1/1968 | France .................... 273/73 F |
| 2030036 | 10/1970 | France . |
| 2568171 | 7/1984 | France . |
| 2581319 | 2/1985 | France . |
| 2670152 | 5/1990 | France . |
| 2670154 | 5/1990 | France . |
| 2665665 | 8/1990 | France . |
| 2671756 | 1/1991 | France . |
| 2673570 | 8/1991 | France . |
| 1596658 | 12/1971 | Germany . |
| 2736125 | 3/1976 | Germany . |
| 3039140 | 5/1982 | Germany . |
| 52-123731 | 10/1977 | Japan . |
| 54-26861 | 2/1979 | Japan . |
| 61-220828 | 10/1986 | Japan . |
| 81-107875 | 5/1993 | Taiwan . |

OTHER PUBLICATIONS

Application of Rim Nylon Composites Reinforced by Continuous Fiber for Tennis Racket Frame, 36th International SAMPE Symposium, (1991).
Mizuno made a racket designated ILWS 95 with S–Liquid Injection Molding and displayed it at the 1991 Super Show in Atlanta, Georgia, The racket used a braided preform.
Rossignol produced a resin injected racket in ab out 1988 usin a woven preform.
Viellard Specification (believed to be an English document closely approximating EPO 470 896 A2).
Processing and Fabrication Technology, pp. 193–204, (1990).
Filament Winding, pp. 2–7, (1966).
Filament Winding Composite Structure Fabrication, pp. 3–4 through 3–7, (1991).

*Primary Examiner*—Catherine Timm

[57] ABSTRACT

A frame for a game racquet such as a tennis racquet is formed by winding a resin-free filament over a mandrel to form a tube, inserting the wound tube into a mold, and injecting resin into the mold. The resin cures in the mold to form a rigid racquet frame

17 Claims, 7 Drawing Sheets

$+\alpha_1$ $+\alpha_2$ $+\alpha_3$ $+\alpha_4$ $+\alpha_5$ $+\alpha_6$ $-\alpha_5$ $-\alpha_4$ $-\alpha_3$ $-\alpha_2$ $-\alpha_1$
$-\alpha_6$

METHOD OF MAKING A CONTINOUS FIBER REINFORCED RESIN TRANSFER MOLDED FRAME FOR A GAME RACQUET

BACKGROUND

This invention relates to a frame for a game racquet, and, more particularly, to a frame which is formed by filament winding and resin transfer molding.

The invention will be explained with reference to frames for tennis racquets. It will be understood, however, that the invention can be used to form frames for other game racquets, such as racquetball racquets, squash racquets, badminton racquets, etc.

Current racquet production methods take composite fiber and resin prepreg materials and roll, wrap, or fold the material by hand into a racquet preform shape. Some racquet frames have been formed by filament winding method in which a tow of resin wetted fiber or resin impregnated fiber (towpreg) is wound over a mandrel to form the preform. The preform is then inserted into a female tool and molded while pressure is applied through an internal bladder inflated with compressed air or by expanding polymeric foam. The methods of both hand layup and wet filament winding are labor intensive, require secondary operations prior to finishing (due to poor as-molded surface finish), and need improved properties for durability or impact strength for a game racquet application. The post-molding operations are labor-intensive and introduce a risk of decreased durability from oversanding the filler material. Wet filament winding uses conventional helical wound tow patterns that by design have inadequate shear properties due to winding discrete layers in the laminate.

Filament winding is a well known process for forming products from filament material such as graphite fiber, glass fiber, etc. In the filament winding process, filament material is wound around a rotating, mandrel to form a tube. The filament material can be in the form of a tow, which is formed from a plurality of filaments or continuous fibers, for example, with carbon 3000, 6000, or 12000 filaments per tow. Fewer or more filaments per tow can be used for carbon as well as other fibers, for example, from one to 50,000.

The filament material is coated with resin before or after winding. The wound tube is placed in a mold having the shape of the end product, and the mold is heated to cure the resin.

Filament wound parts are normally manufactured by winding discrete layers of material on a mandrel, using a helical or geodesic path. Each layer is made up of a 2-ply balanced laminate formed from a multicircuit winding pattern. The number of circuits required for each layer is calculated from the bandwidth of the material and the wind angle, so that the pattern closes and a constant thickness is achieved in the layer. Different layers may be wound at different angles, but each layer typically consists of a $+\alpha°$ angle ply and a $-\alpha°$ angle ply with respect to the longitudinal axis of the rotating mandrel, resulting from the reciprocating traverse of the carriage in the winding machine.

Conventional filament winding produces discrete layers or lamina of fibers. The layers have a tendency to move relative to each other when the wound article is stressed, during removal from the mandrel and loading of the wound tube in the mold. Also, the physical properties of the article are often limited by the shear properties between layers, called interlaminar shear.

Tennis rackets have been produced by conventional filament winding. For example, EPO patent publication No. 0 470 896 describes forming a frame for a tennis racket by winding fibers of glass, carbon, or other materials.

Preforms for racquet frames are generally made from fibers which have been wetted with resin. Sheets or ribbons of fiber and resin are referred to as prepreg. Tows of fiber and resin are referred to as towpreg. However, some attempts have been made to form a dry preform which is wetted with resin in the mold. For example, preforms have been made from braided or woven fibers. The braided or woven preform is inserted into a mold, and the preform is wetted by a resin transfer molding (RTM) or a reaction injection molding (RIM) method. In reaction injection molding a two part monomer system is used, and the monomers react and polymerize in the mold.

Previous attempts to use dry preform for making racquet frames have not been commercially significant, and it is believed that the preforms do not become completely and thoroughly wetted by the resin during the molding operation.

The following definitions are used herein:

CIRCUIT: One complete traverse of the fiber feed mechanism of a filament winding machine.

INTERSPERSE: To sequence wind circuits from two or more patterns in an arbitrary manner as selected by the designer. Each circuit is appied individually such that any combination and sequence of wind angles from the patterns may by applied. No discrete layers or lamina exist.

TOW: Untwisted bundle of continuous filaments

PLY: A single pass on a filament winding machine in which fiber is applied in one direction to the axis of the mandrel A LAYER is typically formed from a series of winding circuits resulting in a closed pattern of 2-plies; one of $+\alpha°$ and the other of $-\alpha°$.

LAMINA: A single ply or layer in a laminate made up of a series of layers.

SUMMARY OF THE INVENTION

The invention forms a racquet frame by using a dry filament winding process to make a dry filament wound preform and wetting the fibers during molding by a resin transfer molding process. The resin moves more easily through a filament wound preform than a braided or woven preform, and thorough wetting can be facilitated by applying vacuum to the mold as the resin is injected. Superior wetting is obtained by using interspersed winding to form the preform. The molded frame surface is substantially free of surface voids and is ready for finishing operations such as painting and graphics with little or no filling and sanding.

DESCRIPTION OF THE DRAWINGS

The drawings will be explained in conjunction with the illustrative embodiments shown in the accompanying drawings, in which.

DESCRIPTION OF SPECIFIC EMBODIMENT

Figure 1:
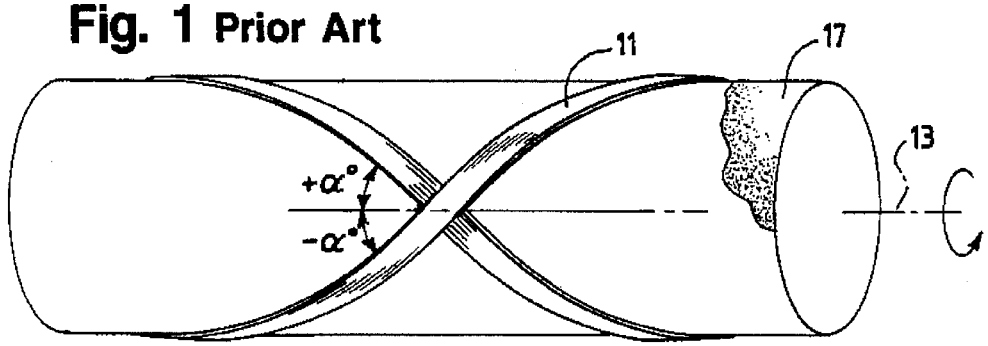
FIG. 1 is a schematic illustration of a helical-wound filament around a mandrel.

FIG. 1 illustrates a helical-wound filament in which tows 11 are wound over a rotating mandrel 12 covered by an inflatable tubular plastic bladder 17. Filament winding machines are well known and need not be described herein. Such winding machines conventionally include a rotary driven, elongated mandrel and a filament-feeding carriage which is mounted for longitudinal movement back and forth the length of the mandrel. The carriage moves along the mandrel in one direction to lay down a filament tow in a constant angle helical path, or geodesic path, and then moves in an opposite direction to lay down the filament at an angle negative to the this previous pass. In conventional winding, after the first circuit is completed, the applied filaments are not adjacent and additional circuits must be traversed before the pattern begins to lay filaments adjacent to each other. This helical path is continued for the number of circuits required to close the pattern in both directions of filament traverse. Once this initial pattern becomes closed and the initial layer is completed, then additional layers are wound in a similar manner as selected by the designer.

Figure 2:
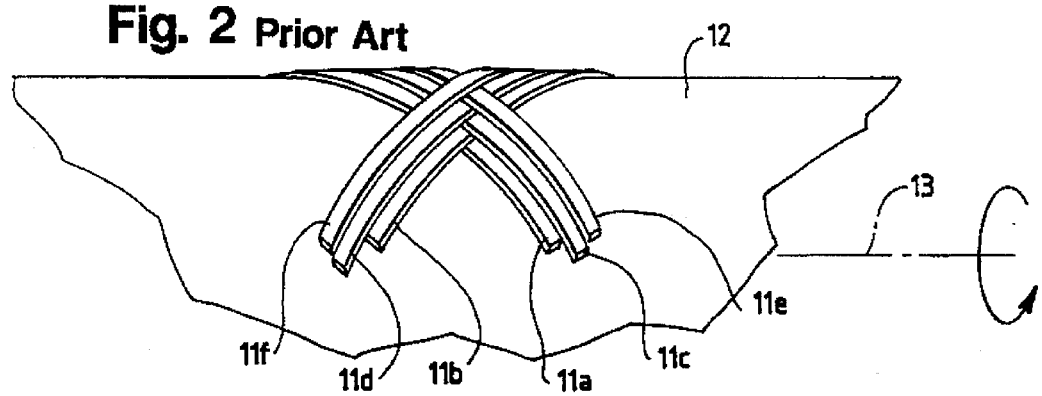
FIG. 2 is a schematic illustration of conventional filament winding.

In FIG. 2 the first circuit of filament material is indicated by the tow 11a which extends at an angle, typically between + near 0° to +45°, to the longitudinal axis 13 of the mandrel. The second circuit of filament material is wound in the opposite direction and is indicated by tow 11b which extends at an angle of minus 0° to −45° to the axis of the mandrel. Succeeding circuits of filament material are indicated by the tows 11c, 11d, 11e, 11f, etc., are wound in a similar manner until the pattern is closed. These windings form the first and second plies, or the initial layer around the mandrel. Once the pattern is closed with these first and second plies, this initial layer is followed by succeeding layers in a similar manner, until the laminate, consisting of various layers of wound filaments is complete.

Figure 3:
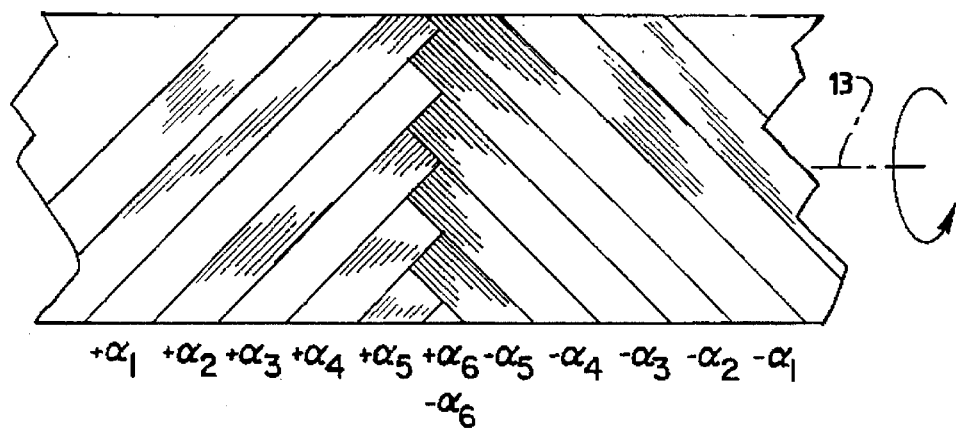
FIG. 3 is a schematic illustration of a conventional helical wind pattern showing the first of three layers of filaments, the first layer (2 - plies) consisting of +α° and −α° angle winds.
Figure 3A:
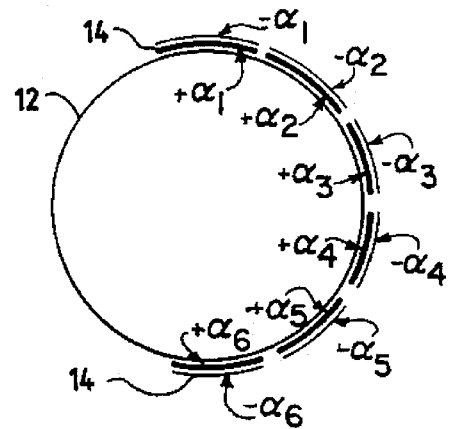
FIG. 3a is a cross-sectional view of the first layer of half the mandrel.

FIGS. 3 and 3a illustrate the initial layer of a conventional helical winding pattern in which both the positive angle ply and the negative angle ply in relation to the centerline 13 of the winding mandrel are closed. In this example, we assume that the winding angle α is 45° and the diameter of the mandrel is such that a total of 9 circuits have been calculated to close the pattern. A one-half cross-sectional view of the mandrel 12 is given showing the two ±45° angle plies of filaments. The length of the arc 14 formed by both the +α° and −α° wind angles is based on tie bandwidth and wind angle of the filament.

Figure 3B:
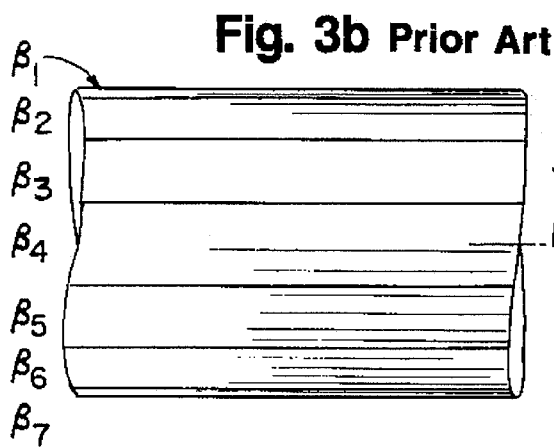
FIG. 3b is a schematic illustration of the middle layer of 0° wind angle filaments.
Figure 3C:
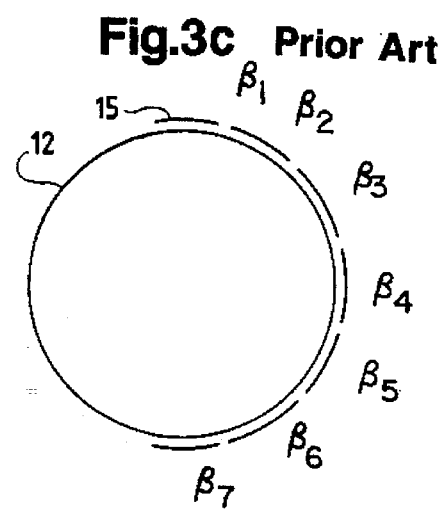
FIG. 3c is a cross-sectional view of the middle layer.

FIGS. 3b and 3c illustrate the middle layer of a conventional winding pattern where the wind angle β is 0°, or parallel, to centerline 13 of the mandrel 12. A one-half cross-sectional view of the mandrel 12 is given showing in this example a total of 12 circuits needed to close this 0° wind pattern. The length of the arc 15 will be equal to the width of the filament.

Figure 3D:
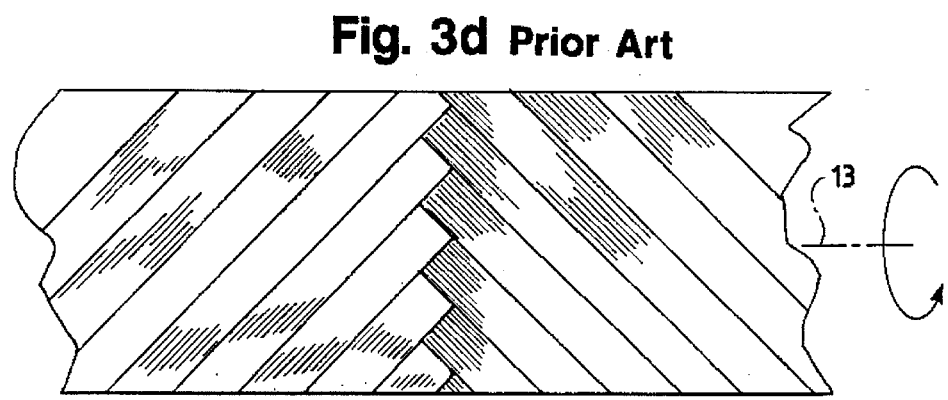
FIG. 3d is a schematic illustration of a conventional helical wind pattern showing the third layer of filaments.
Figure 3E:
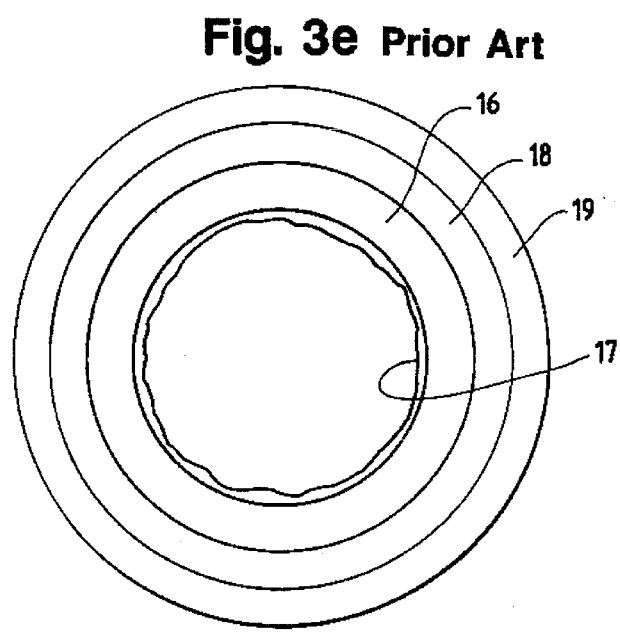
FIG. 3e is a cross-sectional view of all three closed pattern layers.

FIGS. 3d and 3e illustrate the third layer of this laminate structure where the wind angle γ to the centerline 13 of the mandrel is applied to the mandrel in both positive and negative angle plies, as in FIG. 3. In this example, we have selected γ to be equal to 45°, and thus needs 9 circuits to close the pattern. In FIG. 3e, a cross-sectional view of the completed laminate is illustrated consisting of the inflatable bladder, the 1st layer of wound filament 16 wound at angle ±α°; the 2nd layer of wound filament 18 wound at angle ±β°; and the 3rd layer of wound filament 19 wound at angle ±γ°.

The wound dry filament tube is then shaped into a racket preform and inserted into a mold, in which resin is injected, then heated, while the bladder is under pressure to cure the resin and form a rigid, fiber reinforced frame. It is common in racket fabrication to insert reinforcement plies of both 0° and/or 90° fiber cut pieces between the layers of filaments at various locations in the hoop and handle areas of the frame.

Figure 4:
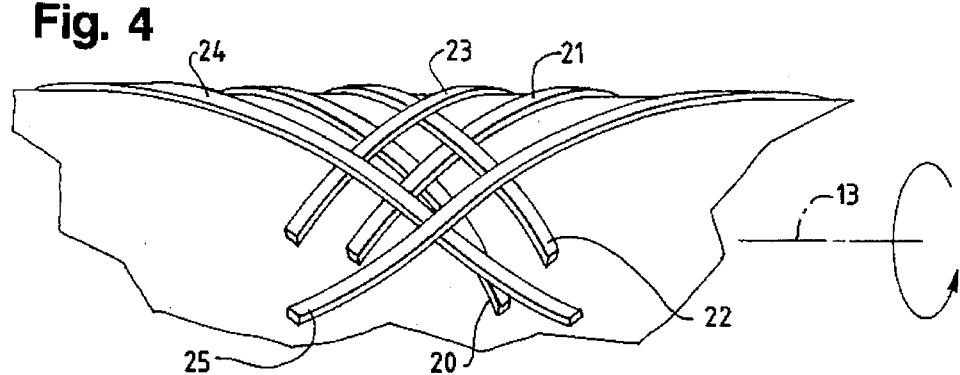
FIG. 4 is a schematic illustration of an interspersed winding method.

FIG. 4 illustrates a method of interspersed filament winding for forming a frame for a game racket. The invention will be explained in conjunction with a frame for a tennis rackets, but the invention can be used to form frames for other types of game racket such as racquetball rackets, squash rackets, badminton rackets, etc.

As in FIG. 1, a conventional rotatable driven mandrel 12 is covered by an inflatable tubular plastic bladder 17. In an example of interspersed winding, the first circuit of filament material is indicated by tow 20, wound at an angle of +α° to the longitudinal axis of the rotating mandrel, and tow 21, wound at an angle of −α° to the mandrel axis. In the next circuit, tow 22 is also wound at +α° and tow 23 is wound at −α°. The next circuit selected by the designer would be from a different wind pattern. Tow 24 is wound at +β° and tow 25 at −β°. The angles of successive circuits are arbitrary and contain circuits from some or all of the patterns selected by the designer.

The step of helically winding filament material can include the following steps:

helically winding a first set of circuits of filament material over an elongated mandrel, the circuits of the first set being wound at ± a first angle relative to the longitudinal axis of the mandrel and the number of circuits in the first set being less than the number of circuits which is required to form a closed pattern at said first angle, helically winding a second set of circuits of filament material over the first set of circuits, the circuits of the second set being wound at ± a second angle which is different than the first angle and the number of circuits in the second set being less than the number of circuits which is required to form a closed pattern at said second angle, helically winding a third set of circuits of filament material over the second set of circuits, the circuits of the third set being wound at ± a third angle which is different than the second angle and the number of circuits in the third set being less than the number of circuits which is required to form a closed pattern at said third angle, and continuing to wind circuits of filament material by moving the carriage back and forth until said portion of the mandrel is covered by the filament material.

Adjacent circuits of each set of circuits are separated longitudinally along the mandrel.

Figure 5:
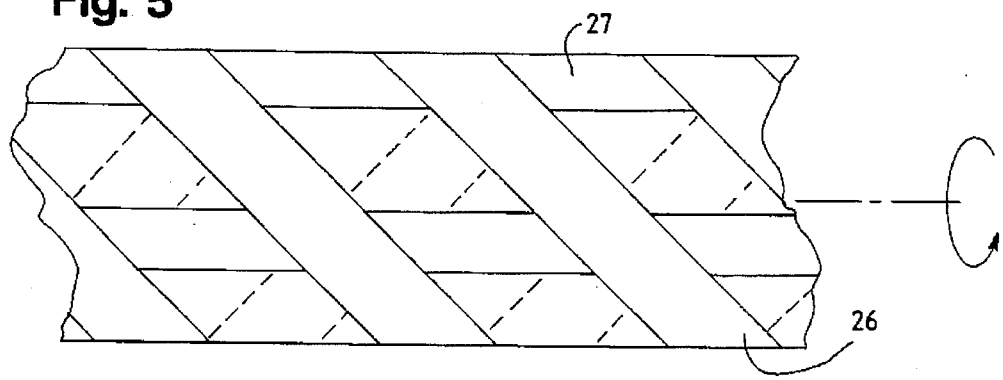
FIG. 5 is a schematic illustration of an interspersed winding pattern showing only the initial few circuits for clarity.
Figure 5A:
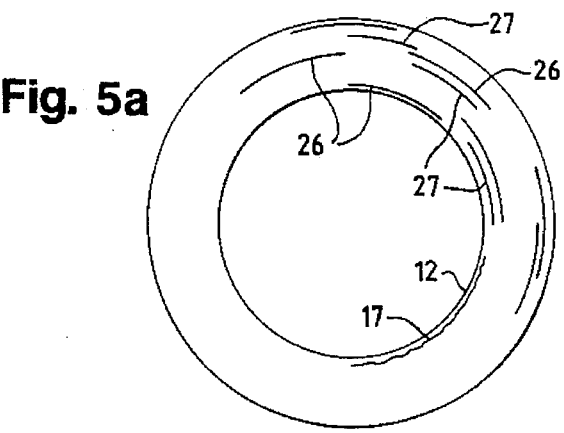
FIG. 5a is a cross-sectional view of the pattern of FIG. 5.

FIG. 5 illustrates an example of a interspersed wound laminate that consists of a combination of ±45° and 0° filaments. In this pattern, 16 circuits of ±45° filaments are required to achieve a closed pattern and 12 circuits of 0° filaments to close. The designer has chosen to intersperse the circuits in such a manner to alternate these two patterns after every four circuits. In FIG. 5a, the resulting laminate cross-section shows the position of the ±45° bands 26 and the 0° bands 27.

Figure 6A:
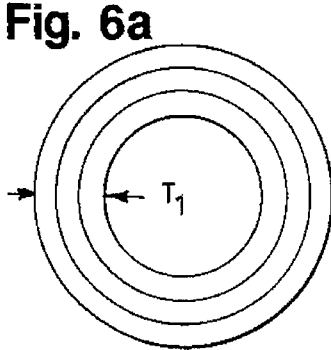
FIG. 6a is a cross-sectional view of a conventional wind pattern of 3 layers of filaments.
Figure 6B:
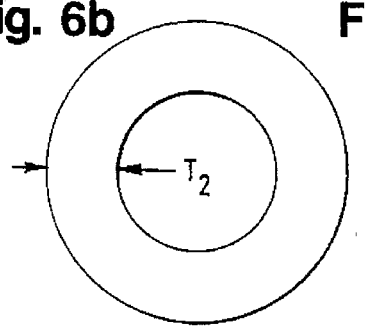
FIG. 6b is a cross-sectional view of an interspersed wind pattern to form the laminate.
Figure 6C:
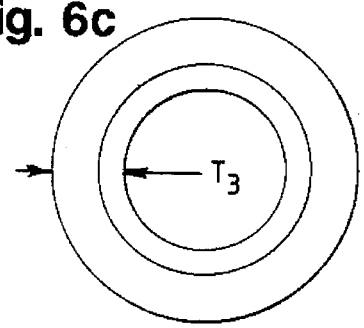
FIG. 6c is a cross-sectional view of a combination design consisting of a convention wound inner layer, covered by interspersed wound circuits.

FIGS. 6a through 6c illustrate a cross-sectional view showing three possible patterns that would be applicable in filament winding of game rackets. In FIG. 6a, a conventional wound tube is given with the laminate thickness of $t^1$. This prior art wound tube has three layers, as discussed in FIG. 3. In FIG. 6b, a wound tube consisting of a series of circuits wound with an interspersed pattern, as discussed in FIG. 5, is given with the layer thickness of $t^2$. In order to provide additional strength for the string holes which will be drilled in the completed frame, it may be desirable to form a completely closed inner or outer layer, or both, of filaments wound in a conventional manner. In FIG. 6c, a combination design is presented of an inner layer formed by a conventional helical wind followed by a series of circuits wound using an interspersion of two patterns with a resulting laminate thickness of $t^3$. In order to maintain the final weight of the preform laminate the total thickness 28 would be the same for each option, that is $t^1=t^2=t^3$.

Figure 7:
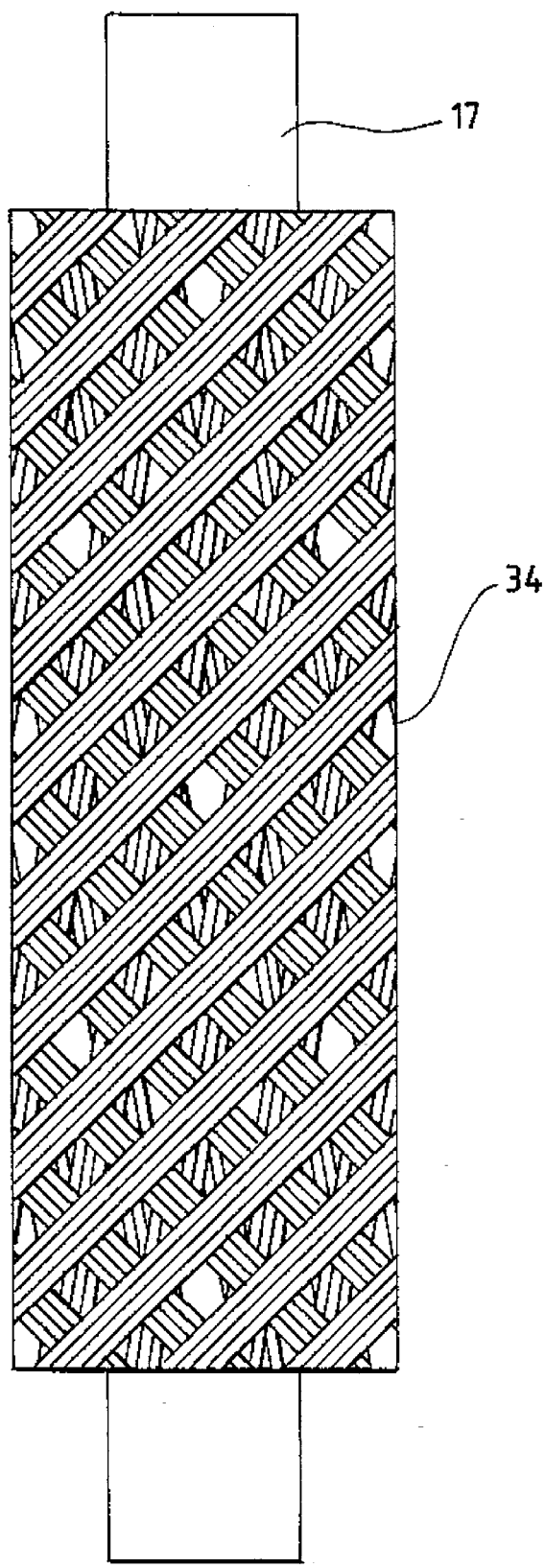
FIG. 7 illustrates the wound tube and an inflatable bladder during the placement of the initial circuits of material.

FIG. 7 illustrates a filament wound preform or tube 34 after it has been removed from the mandrel. The tube can be made either by the conventional helical winding method or the interspersed helical winding method. The tows which are used to form the wound tube are preferably formed from graphite fibers. However, the fibers can also be used either alone or in combination, such as glass, aramid, boron, etc. An inflatable bladder 17 is positioned inside the tube. The bladder can be inserted into the tube after the tube is wound and removed from the mandrel, or the bladder can be inserted over the mandrel so that the tube is wound over the bladder. FIG. 1 illustrates inserting the bladder on the mandrel before winding. The bladder is conventional and can be formed from plastic or elastomeric material.

Figure 8:
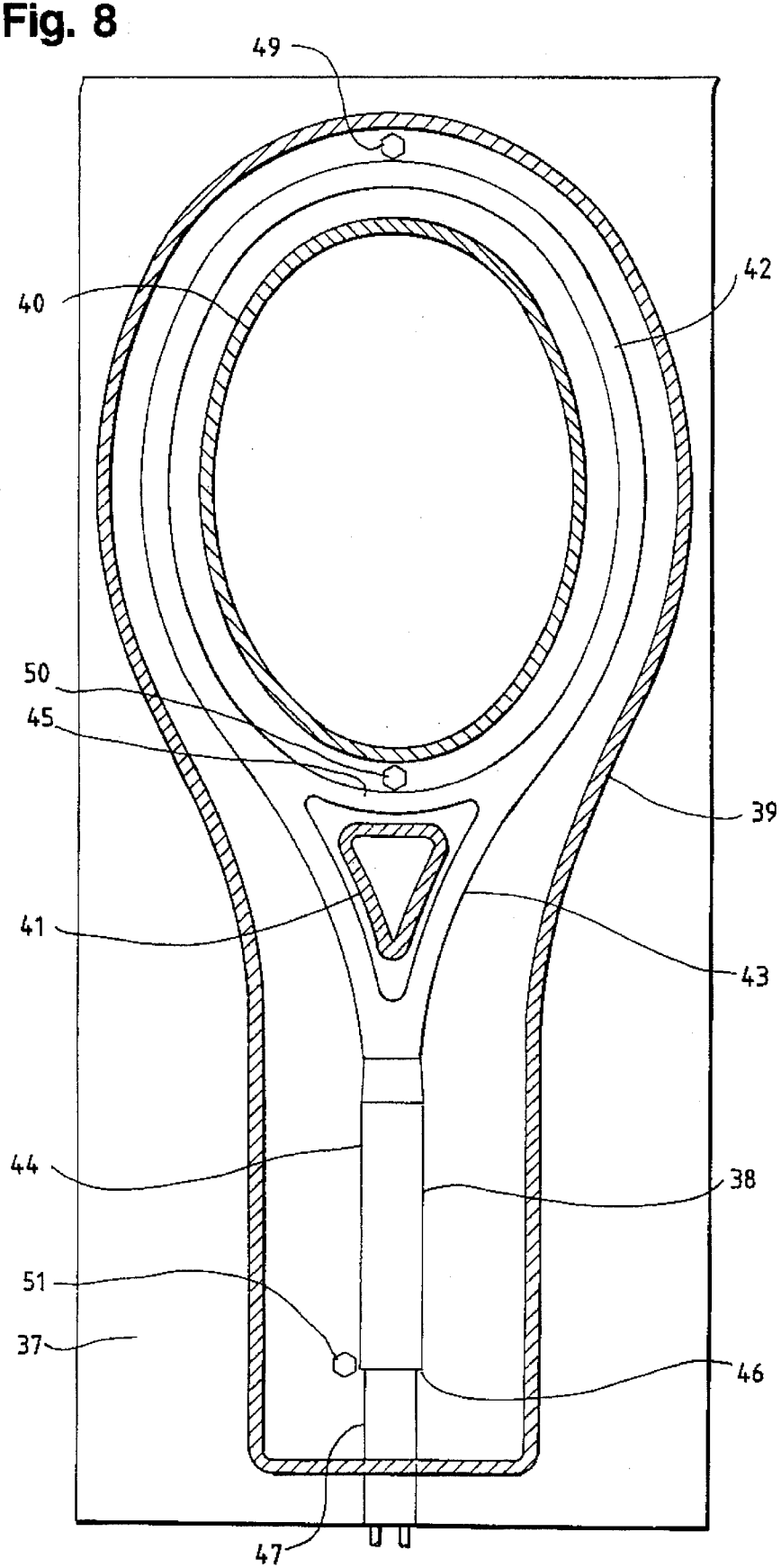
FIG. 8 is a plan view of a resin transfer mold for a tennis racket frame.

FIG. 8 illustrates one-half of a resin transfer mold 37. The mold includes a cavity 38, and an outer elastomer seal 39 which surrounds the cavity, and inner elastomer seals 40 and 41. The mold cavity has the shape of a racquet frame and includes a hoop-shaped head portion 42, a throat portion 43, and a handle portion 44. A yoke portion 45 extends across the throat portion and forms the bottom of the head portion. The bottom or butt end of the handle is formed by the cavity surface 46. A bladder manifold 47 extends from the butt end to the outside of the mold for encasing and protecting the bladder.

A resin inlet fitting 49 on the mold communicates with the mold cavity at the top or 12 o'clock position of the head. A resin outlet fitting 50 communicates with the mold cavity at the bottom or 6 o'clock position of the head. A second resin outlet fitting 51 communicates with the mold cavity.

The tube 34 is positioned in the mold cavity 38 so that the middle portion of the tube wraps around the head portion 42, and the two end portions of the tube extend along the handle portion 44. The ends of the bladder 17 extend through the manifold 47. A yoke portion is inserted into the yoke cavity 45 and is attached to the tube 34, for example, by graphite tape.

Figure 9:
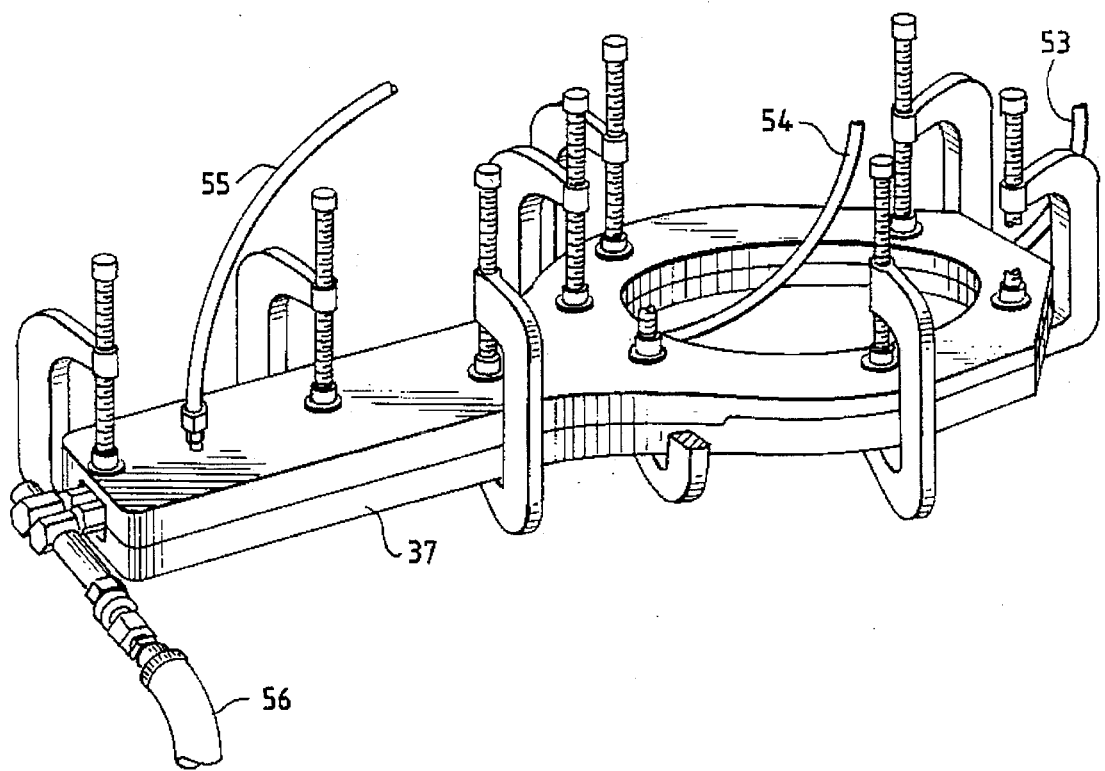
FIG. 9 is a perspective view of the mold.

FIG. 9 illustrates both halves of the mold after the mold is closed over the tube and clamped. Resin inlet tube 53 is connected to the inlet fitting 49, and resin outlet tubes 54 and 55 are connected to outlet fittings 50 and 51. An air pressure hose 56 is connected to the ends of the bladder 17 for inflating the bladder and forcing the tube against the walls of the mold cavity. The bladder is inflated to an air pressure, typically about 50 pounds per square inch (psi), prior to the injection of resin and remains inflated at or near that pressure during the resin injection.

A conventional polymer resin is injected under pressure into the mold cavity through the inlet tube 53 and the inlet fitting 49. The resin pressure required to impregnate the fibers during injection is dependent on the resin viscosity, which is typically below 500 centipoise for most commercially available resin systems for RTM, and the bladder pressure. With a bladder pressure of 50 psi, the resin pressure, as measured at the inlet fitting 49, would be kept between 25 and 40 psi during injection to prevent the bladder from collapsing, and allowing the resin to bypass the fibers, resulting in poor impregnation of the fiber with resin. The resin flows under pressure between the windings of the filament wound tube and exits through the outlet fittings 50 and 51 and tubes 54 and 55. The flow of the resin through the windings can be facilitated by applying suction from a vacuum pump to the outlet tubes 54 and 55. Vacuum application during resin injection also aids in the removal of air from the mold cavity which can result in the occurrence of internal voids in the molded racquet frame. A variety of resins that are commercially available can be used, for example, Dow Tactix 123, but it is critical that the resin be toughened to have high elongation properties which are necessary to provide a high durability for the racquet frame. It is common to add elastomers to the resin to improve the toughness of the resin system and achieve these durability properties.

While satisfactory results can be obtained from conventional helical filament wound tubes, superior results can be obtained from interspersed filament wound tubes. Conventional wound tubes result in discrete layers and are subject to interlaminar shear failure of the laminate. A dry filament wound tube made in a conventional manner with discrete layers may be difficult to handle after it is removed from the mandrel and during insertion into the mold.

The arbitrary interspersion of wound circuits provided by the interspersed winding technique results in a three dimensional interlocking of the fibers. The interlocked fibers maintain the structural integrity of the wound tube after the tube is removed from the mandrel. The interlocking of the fibers also reduce the tendency of the racquet frame to fail in the interlaminar shear mode because no discrete layers exist. The interlocking of continuous fibers increases the stiffness of the molded game racquet. The interspersed fibers also permits more consistent resin flow through the windings of the preform, resulting in more complete wetting of the fibers with the resin.

Figure 10:
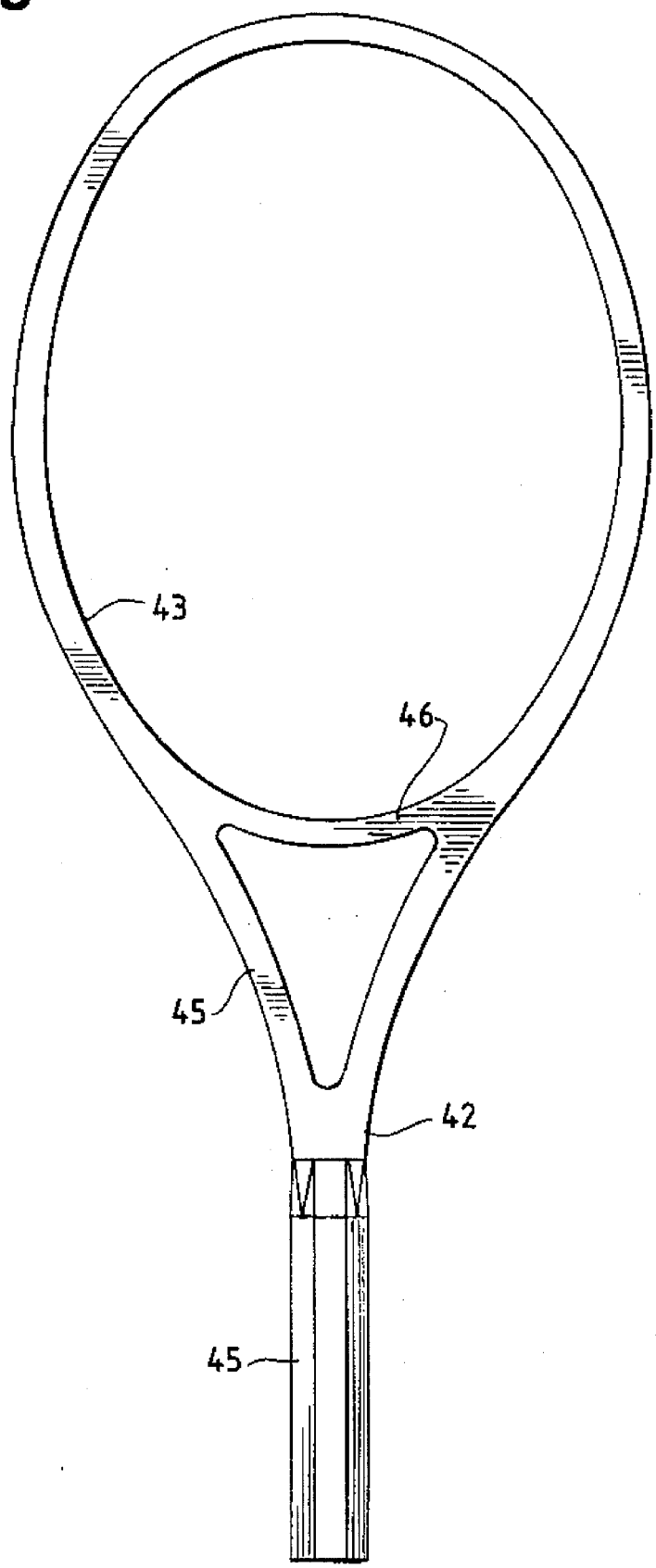
FIG. 10 is a front elevation view of a tennis racket frame.

After the preform is wetted with resin, the mold is heated to cure the resin and form a rigid frame. FIG. 10 illustrates a molded tennis racquet frame 58 after it is removed from the mold. The frame is shaped like the mold cavity and includes a head 59, a yoke 60, and a handle 61. Since the resin was forced under pressure against the mold surface, the surface of the frame is smooth and substantially free of surface voids. The frame is ready for painting and application of graphics with little or no filling and sanding of the surface.

While in the foregoing specification, a detailed description of a specific embodiment of the invention was set forth for the purpose of illustration, it will be understood that many of the details herein given may be varied considerably by those skilled in the art without departing from the spirit and scope of the invention.

We claim:

1. A method of making a frame for a game racquet comprising the steps of:

helically winding filament over an elongated mandrel to form a tube of filament material, removing the tube from the mandrel, positioning the tube in a mold having a surface which defines a cavity having the shape of a game racquet frame, the mold cavity having a hoop-shaped head portion having a top and a bottom and a handle portion extending from the bottom of the head portion and terminating in a butt end, the mold having a first outlet means for allowing resin to escape from the bottom of the head portion of the mold cavity and a second outlet means for allowing resin to escape from either the top of the head portion or the butt end of the handle portion of the mold cavity, clamping the mold to close the mold cavity, pressurizing the tube to force the tube against the surface of the closed mold cavity, injecting resin under pressure into the closed mold cavity to coat the pressurized tube of filament material and allowing resin to escape from the first and second outlet means, allowing the resin to cure to form the tube and resin into a rigid frame, and removing the frame from the mold.

2. The method of claim 1 including the step of applying suction to said first outlet means as the resin is injected to evacuate air and draw the resin between the filaments and through the mold cavity.

3. The method of claim 1 in which the second outlet means is at the butt end of the handle portion of the mold cavity and the resin is injected into the mold cavity at the top of the head portion and flows out of the mold cavity at the bottom of the head portion and at the butt end of the handle portion.

4. The method of claim 3 including the step of applying suction to said first and second outlet means as the resin is injected to evacuate air and draw the resin between the filaments and through the mold cavity.

5. The method of claim 1 in which the second outlet means is at the top of the head portion of the mold cavity and the resin is injected into the mold cavity at the butt end of the handle portion and flows out of the mold cavity at the bottom of the head portion and at the top of the head portion.

6. The method of claim 5 including the step of applying suction to said first and second outlet means as the resin is injected to evacuate air and draw the resin between the filaments and through the mold cavity.

7. The method of claim 1 in which, before the tube is positioned in the mold cavity, reinforcement pieces are added to the tube at selected locations to improve the properties of the molded racquet frame.

8. The method of claim 1 in which the filament material includes graphite and one or more fibers selected from glass, aramid, boron, and polymeric.

9. The method of claim 1 including the steps of inserting a bladder over the mandrel before the winding step and removing the bladder from the mandrel with the tube, the tube being pressurized by inflating the bladder.

10. The method of claim 1 including the step of inserting a bladder in the tube after the tube is removed from the mandrel, the tube being pressurized by inflating the bladder.

11. The method of claim 1 in which the tube is pressurized at about 50 psi and the resin is injected under pressure of about 25 to 40 psi.

12. A method of making a frame for a game racquet comprising the steps of:

helically winding filament over an elongated mandrel to form a tube, the step of helically winding filament including the steps:

feeding the filament from a carriage which moves back and forth in opposite directions parallel to the longitudinal axis of the mandrel, helically winding a first set of circuits of filament over an elongated mandrel, the circuits of the first set being wound at plus a first angle relative to the longitudinal axis of the mandrel by moving the carriage in one direction and at minus the first angle relative to the longitudinal axis of the mandrel by moving the carriage in the opposite direction and the number of circuits in the first set being less than the number of circuits which is required to form a closed pattern at said first angle, helically winding a second set of circuits of filament over the first set of circuits, the circuits of the second set being wound at plus a second angle relative to the longitudinal axis of the mandrel which is different than the first angle by moving the carriage in one direction and at minus the second angle relative to the longitudinal axis of the mandrel by moving the carriage in the opposite direction and the number of circuits in the second set being less than the number of circuits which is required to form a closed pattern at said second angle, and helically winding a third set of circuits of filament over the second set of circuits, the circuits of the third set being wound at plus a third angle relative to the longitudinal axis of the mandrel which is different than the second angle by moving the carriage in one direction and at minus the third angle relative to the longitudinal axis of the mandrel by moving the carriage in the opposite direction and the number of circuits in the third set being less than the number of circuits which is required to form a closed pattern at said third angle, continuing to wind circuits of filament by moving the carriage back and forth until said portion of the mandrel is covered by the filament, removing the tube from the mandrel, positioning the tube in a mold having a surface which defines a cavity having the shape of a game racquet frame the mold cavity having a hoop-shaped head portion having a top and a bottom and a handle portion extending from the bottom of the head portion and terminating in a butt end, the mold having a first outlet means for allowing resin to escape from the bottom of the head portion of the mold cavity and a second outlet means for allowing resin to escape from either the top of the head portion or the butt end of the handle portion of the mold cavity, clamping the mold to close the mold cavity, pressurizing the tube to force the tube against the surface of the closed mold cavity, injecting resin under pressure into the closed mold cavity to coat the filaments of the pressurized tube and allowing resin to escape from the first and second outlet means, allowing the resin to cure to form the tube and resin into a rigid frame, and removing the frame from the mold.

13. The method of claim 12 including helically winding a fourth set of circuits of filament over the third set of circuits, the circuits of the fourth set being wound at plus a fourth angle relative to the longitudinal axis of the mandrel which is different than the third angle by moving the carriage in one direction and at minus the third angle relative to the longitudinal axis of the mandrel by moving the carriage in the opposite direction and the number of circuits in the fourth set being less than the number of circuits which is required to form a closed pattern at said fourth angle.

14. The method of claim 12 in which adjacent circuits of each set of circuits are separated longitudinally along the mandrel.

15. The method of claim 12 in which, before the step of winding said first set of circuits, a layer of filament is helically wound, the layer comprising a plurality of circuits of filament wound at ± the same angle until the pattern formed by the circuits is substantially closed.

16. The method of claim 15 in which, before removing the tube from the mandrel, a layer of filament is helically wound, the layer comprising a plurality of circuits of filament material wound at ± the same angle until the pattern formed by the circuits is substantially closed.

17. The method of claim 12 in which before removing the tube from the mandrel, a layer of filament is helically wound, the layer comprising a plurality of circuits of filament wound at ± the same angle until the pattern formed by the circuits is substantially closed.

* * * * *